Figure 1:
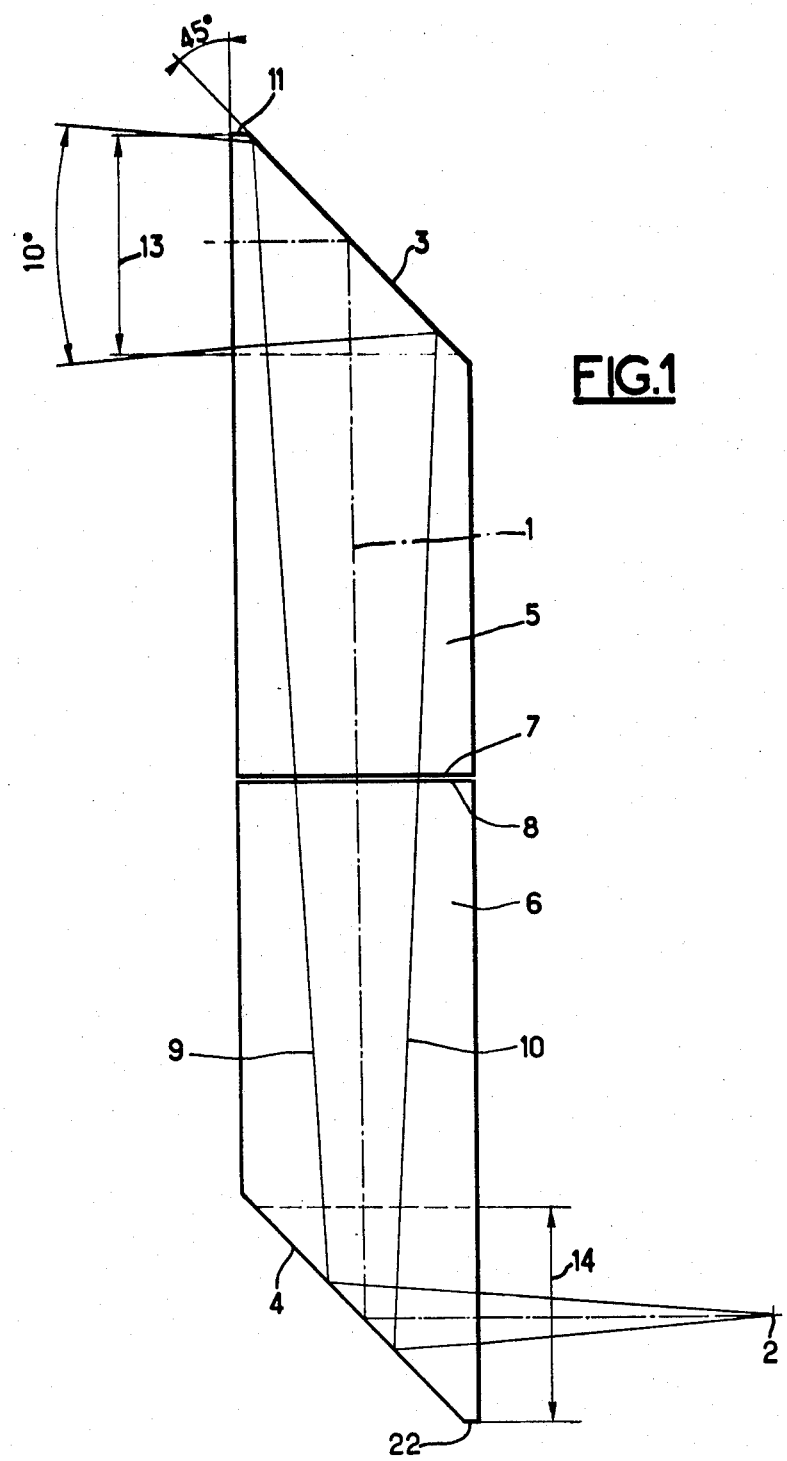

United States Patent
Clave et al.

[11] 4,173,394
[45] Nov. 6, 1979

[54] PRISM COMBINATION PERISCOPE

[76] Inventors: Serge Clave; Marcel Clave, both of 9 rue Olivier Metra, 7502 Paris, France

[21] Appl. No.: 819,676

[22] Filed: Jul. 28, 1977

[30] Foreign Application Priority Data

Sep. 20, 1976 [FR] France .................. 76 28172

[51] Int. Cl.$^2$ ................ G02B 13/08; G02B 17/00
[52] U.S. Cl. ........................... 350/181; 350/202; 350/212; 350/301
[58] Field of Search ............ 350/181, 182, 202, 212, 350/301

[56] References Cited

FOREIGN PATENT DOCUMENTS

| 692755 | 6/1940 | Fed. Rep. of Germany | 350/202 |
| 994015 | 6/1965 | United Kingdom | 350/212 |

*Primary Examiner*—Paul A. Sacner
*Attorney, Agent, or Firm*—Brisebois & Kruger

[57] ABSTRACT

A periscope having parallel reflecting end faces each at an angle less than 45° to parallel inlet and outlet faces of the prism combination. Light entering, for example, the inlet face at the region of one inclined face, is reflected four times within the prism combination. Two reflections occur at each of the inclined faces, and two reflections occur along portions of the inlet and outlet faces between the inclined end faces, so that the optical path through the periscope takes the form of a zig-zag or broken line multiple reflection path. Plano-concave cylindrical eye-piece lenses can be provided at the light inlet and light outlet regions of the inlet and outlet faces. Convex cylindrical diopters, facing each other, can be provided between the adjacent ends of the prisms.

4 Claims, 4 Drawing Figures

PRISM COMBINATION PERISCOPE

It is known to use two substantially adjacent prisms each comprising a face inclined at an angle of 45° and truncated or flattened at those edges where the 45° angle faces join the two parallel faces of the prism that form respectively the inlet face and the outlet face for light rays, such arrangement being used to provide periscopic systems of sufficient width to provide the viewer with a relatively extended horizontal field, the arrangement also providing an angular field of vision, depending upon the heights of the openings in the useful portions of the above-mentioned inlet and outlet faces, when the eye of the viewer is at a distance in the order of 50 mm from the outlet face for the light rays emanating from the object to be viewed.

However, these heights of opening are reduced to a certain extent because of the aforementioned truncation designed to avoid sharp edges which are likely to become damaged, and these heights are in all instances less than the thickness of said prisms in the transverse direction.

In the first Certificate of Addition No. 83.193 to their U.S. Pat. No. 1,289,488, the present Applicants described an afocal cylindrical lens arrangement which can be associated with such prisms for the purpose of increasing the angular sighting vision.

The object of the present invention is to provide a new combination of prisms which, on the one hand, enables saving in material to be effected by reducing the thickness of the prisms and, on the other hand, provides a greater angular field of vision, so that this combination can be used alone or in association with an afocal arrangement of the above-mentioned type.

One of the features of the new arrangement resides in the fact that by inclining the end faces of these two prisms at an angle of less than 45° while maintaining the parallelism of these two faces to bring about a shift in the sighting axis, instead of obtaining openings for the field of vision that have a vertical depth necessarily less than the front to back thickness of the prisms, it is possible to obtain, by using the new combination, effective openings which are distinctly greater than the thickness of the prisms in the transverse direction.

This result is achieved because of the fact that, due to the use of inclined faces which form angles, considerably less than 45°, with the inlet and outlet faces, the light rays reflected at the upper inclined face are directed to the inlet and outlet faces, where they undergo two further reflections, instead of being passed directly to the second, lower, inclined face.

Because of this quadruple reflection, which causes the light beam to follow an oblique path within the prisms, it is possible to reduce the thickness of the prismatic blocks, and effective openings that are larger in the vertical direction are obtained for the useful portion of the inlet and outlet faces, so that the vertical field of sighting vision can be appreciably increased despite the above-mentioned truncation.

To quote a non-limiting example, a curve plotted in the case of a glass having a nd index of 1.523, and using angles in the order of 36° and a front to back thickness of 30 mm, instead of angles of 45° and a thickness of 40 mm, shows that for the same shift of the optical axis and after truncation of the edges of angles of reduced value, openings are obtained having a depth in the order of 42 mm in the vertical direction, instead of 34 mm for angles of 45°.

Consequently, the angle of field that can be seen by a viewer, whose eye is approximately 50 mm from the face of the lower prismatic block adjacent to the viewer, is increased by 20% (and is 12° instead of 10°).

A further interesting feature of the new arrangement relates to the fact that, since the light rays follow broken-line paths through the prisms in the new combination, it is possible to hollow out all the portions not traversed by the light rays, and this results in a quite appreciable saving in weight and therefore of raw material if these prisms are produced by moulding.

It is of course possible, by the use of suitable algebraic formulae, to calculate the optimum summit angle in the new combination having four reflecting surfaces, as a function of the required periscopic height and of the reduced thickness in the transverse direction that has been selected, or, on the other hand, it is possible to select an increased sighting field and to determine a reduced thickness of the new combination for a given periscopic height and acute angle, while largely retaining the same length of optical path between the inlet and outlet faces, comparable with that used in combinations having two reflecting surfaces, so as to maintain a field of observation that is identical in horizontal vision.

Once the summit angle has been determined, the size of the openings affording passage to the light rays and the extent of the maximum truncation of said summit angle can be easily deduced.

It should be stated that, in the case where the new prismatic combination is associated with an afocal arrangement of the above-mentioned type, the depth of the opening is always greater than the front to back thickness of the prisms.

Furthermore, the width of the inlet pupil or separation to be provided at the middle i.e. between the adjacent faces of the prisms of the new combination, in this case is likewise greater than the front to back thickness of said prismatic masses because of its inclination in relation to the vertical axis of the combination.

These features as a whole enable the field of sighting vision to be improved, as compared with the known prismatic combinations having two reflecting surfaces inclined at an angle of 45° and having an afocal arrangement where the respective heights of the openings are smaller than the thickness of the prisms due to the above-mentioned truncation of the summit angles and to the width of the pupil in the transverse direction which is at most equal to the thickness of the prisms.

A further notable advantage of the present invention resides in the fact that the new prismatic combination, since it is of reduced thickness, can be completed by the provision of protective eye-pieces without however increasing the dimensions of the mountings used for the combinations having two reflecting surfaces. These eye-pieces may be formed either by planar sheets having parallel faces, or by the plano-concave cylindrical lenses of the above-mentioned afocal arrangement.

Figure 2:
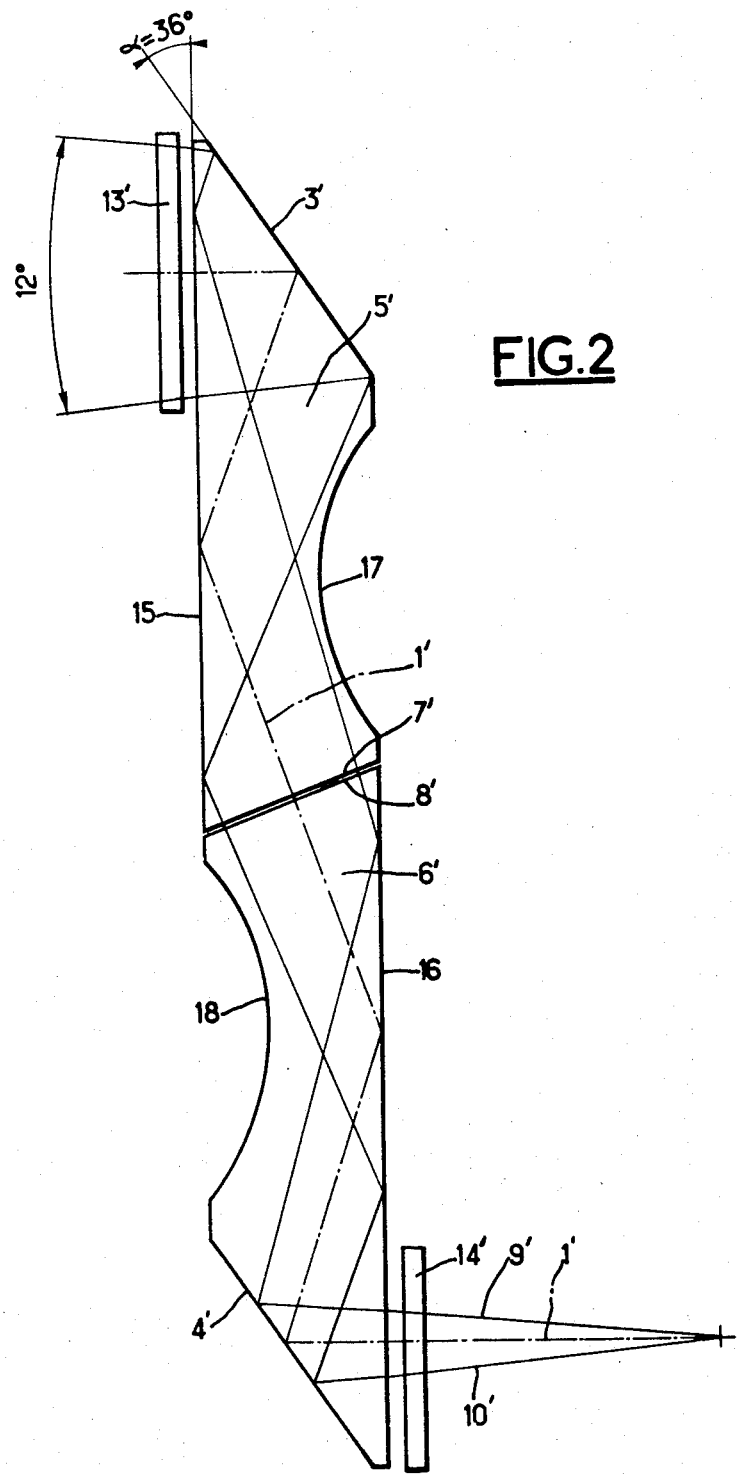
Figure 3:
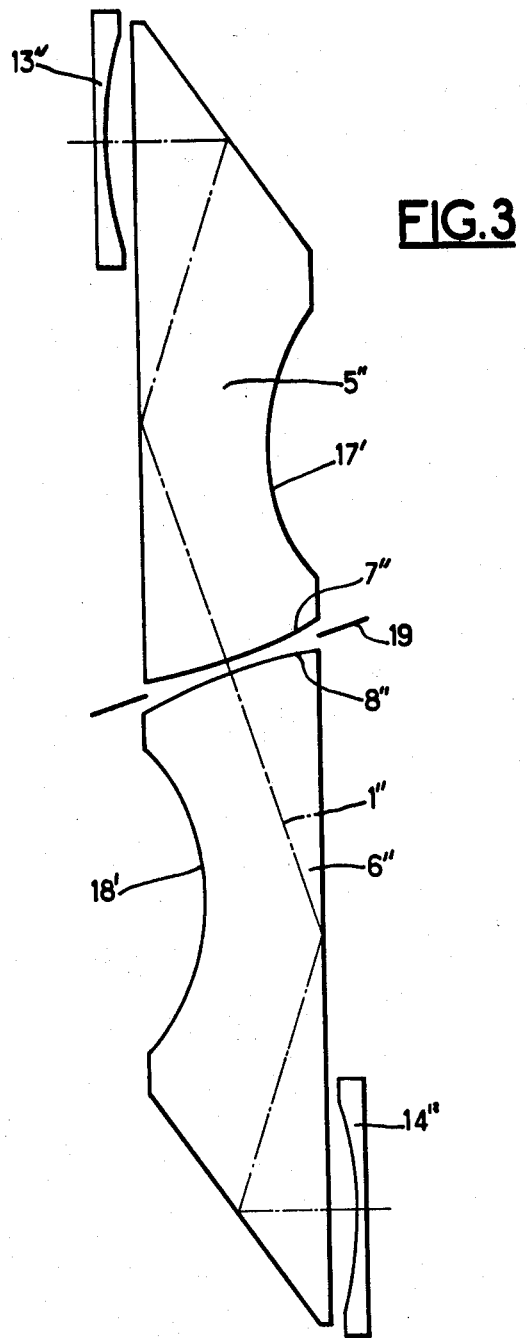
Figure 4:
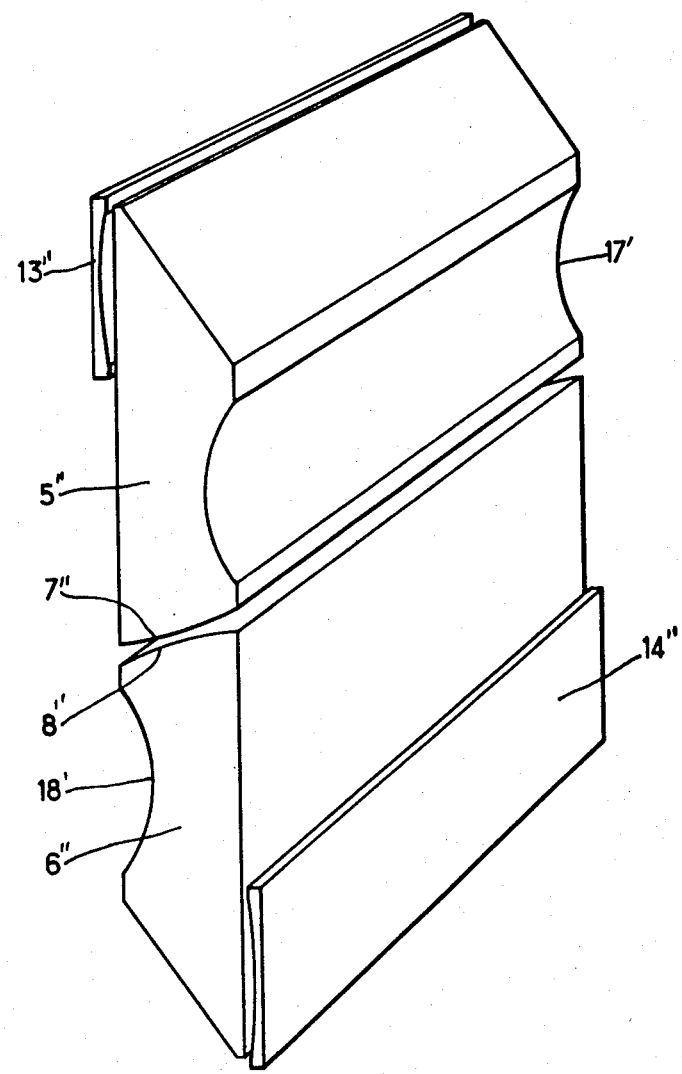

The features of the present invention will be better understood from consideration of the following description of two embodiments of the invention, one relating to the use of planar eye-pieces having parallel faces and the other to the use of eye-pieces formed by plano-concave cylindrical lenses forming part of an afocal arrangement, these embodiments being provided as non-limiting examples and being described by reference to the attached drawings in which:

FIG. 1 is a diagrammatic view in elevation of the path followed by the light rays through two 45° prisms having parallel faces, made of a glass having a mean nd index of 1.523 and having front to back thickness of 40 mm and a periscopic depth of 180 mm;

FIG. 2 is a view corresponding to FIG. 1 and showing a new combination which is made of the same glass having a mean nd index of 1.523, the thickness in the front to back direction being reduced to 30 mm, and the periscopic depth remaining the same at 180 mm, but with acute angles in the order of 36° which provide four reflections, the lengths of the two optical paths of FIG. 1 and FIG. 2 being the same between the inlet and outlet faces for the light rays;

FIG. 3 is an elevational view of the new combination having four reflecting surfaces and associated with an afocal arrangement of the above-mentioned type and comprising four cylindrical lenses; and FIG. 4 is a perspective view of the system illustrated in FIG. 3.

It will be seen from FIG. 1 that the light rays pass along the optical axis 1 from the eye 2 of the viewer to the outlet opening and are reflected in turn at the two faces 4 and 3 inclined at an angle of 45°, the light rays following a vertical path within the two prisms 5 and 6 and between these two reflecting faces.

The two prismatic masses 5 and 6 are separated at 7 and 8 only by a narrow gap which causes practically no angular change in the beam passing between the faces 3 and 4.

Because of the necessary truncation or flattening of the 45° angle edge at the ends of the faces 3 and 4, and as seen at 11 and 22, the useful portions of the openings 13 and 14, which are symmetrical, are of a height smaller than the thickness of the prisms 5 and 6 in the front to back direction.

In this example a viewer whose eyes are at a distance of 50 mm from the lower inlet face is able to observe a sighting field of 10°.

If the arrangement illustrated in FIG. 2 is now examined, it will be seen that the light rays 1', 9' and 10' undergo four reflections at the inclined faces 3' and 4' on the one hand but also at the inlet and outlet faces 15 and 16 respectively on the other hand; because of this, the optical path covered between the faces 3' and 4' is along a broken line and this enables those portions through which the light rays do not pass to be hollowed at 17 and 18 so as to reduce the weight of the combination.

In this example, a viewer positioned in the same manner as with the FIG. 1 arrangement, i.e. at a distance of 50 mm from the inlet face, is able to view a sighting field of 12°, i.e. the field is increased by 20% above that obtainable with the FIG. 1 combination, while the thickness from front to back is reduced by 25%, and the hollowed portions 17 and 18 further reduce the weight.

Since, as previously stated, the two combinations illustrated in FIGS. 1 and 2 have the same optical path between the inlet and outlet openings, the same horizontal field is obtained.

As also mentioned previously, this new combination, because of its reduced thickness, can be completed by the addition of protective eye-pieces 13' and 14', without appreciably increasing the transverse dimension of the FIG. 1 combination.

FIG. 3 illustrates the new combination associated with an afocal arrangement of the type described in the above-mentioned Addition No. 83.193 to French Pat. No. 1,289,488.

To simplify the drawing, only the light path along the optical axis 1" is illustrated. The two plano-concave cylindrical lenses of the afocal arrangement are shown at 13" and 14", and they perform the function of eye-pieces, whereas the two cylindrical diopters 7" and 8" delimit the prismatic masses 5" and 6" at the middle of the combination.

It will also be seen from this Figure that the dimension of the actual pupil as shown diagrammatically at 19 by a diaphragm becomes greater than the thickness of the prismatic blocks because of its slope, so that, combined with the openings 13" and 14", it contributes to a considerable increase in the field obtained as compared with the combination comprising an afocal arrangement having two 45° prisms, in which combination the dimension of this pupil, at right-angles to the vertical optical axis, is at most equal to the thickness of the prisms in the transverse direction.

FIG. 4 shows the reference numerals 5" and 6" as well as 17' and 18', the plano-concave lenses 13" and 14" and the convex diopters 7" and 8" also being shown therein.

It will be readily understood that various modifications, improvements or additions can be made to the embodiments that have been described, and that the periscopic height of the new arrangement may be modified so as to avoid excessive increase in the vertical dimensions of the previously-mentioned mountings, while retaining the improvements and advantages previously described.

What is claimed is:

1. In a prismatic combination for periscopic viewing comprising two prismatic masses having two parallel respective light ray inlet and outlet faces and two parallel end faces inclined relative to said light ray inlet and outlet faces, respectively, the light ray entering the prismatic combination substantially normal to the inlet face being reflected from one end face after entering the combination and the light ray leaving the prismatic combination substantially normal to the outlet face being reflected from the other end face before leaving the combination, the inlet and the outlet directions of the light ray being substantially parallel, the improvement wherein the said end face on which the light ray is reflected after entering the combination and the said end face on which the light ray is reflected before leaving the combination are inclined at the same angle substantially less than 45° relative to said inlet and outlet faces, respectively, providing between the said two end faces a broken line optical path causing four reflections of light rays inside the combination, the first on one of said end faces, the second on said inlet face, the third on said outlet face and the fourth on said other end face.

2. A prismatic combination according to claim 1 and further comprising plano-concave cylindrical eye-piece lenses adjacent the respective inlet and outlet faces, and the planar faces of which face outwards, and two convex cylindrical diopters between the prisms of said combination and facing each other.

3. A prismatic combination as defined in claim 1, wherein the portions of the prismatic masses situated outside the broken line optical path are arcuately hollowed opposite the location of said second and third reflections.

4. A prismatic combination according to claim 3 and further comprising plano-concave cylindrical eye-piece lenses adjacent the respective inlet and outlet faces, and the planar faces of which face outwards, and two convex cylindrical diopters between the prisms of said combination and facing each other.

* * * * *